United States Patent Office 3,096,320
Patented July 2, 1963

3,096,320
WATER-INSOLUBLE MONOAZO AND DISAZO
1,3,4-THIADIAZOLE DYESTUFFS
Guenter Lange, Ludwigshafen (Rhine), Gartenstadt, and Gerhard Luetzel, Hans Guenter Wippel, Hans Weidinger, and Joachim Kranz, Ludwigshafen (Rhine), Germany, assignors to Badische Anilin- & Soda-Fabrik Aktiengesellschaft, Ludwigshafen (Rhine), Germany
No Drawing. Filed Mar. 28, 1960, Ser. No. 17,770
Claims priority, application Germany Mar. 28, 1959
6 Claims. (Cl. 260—158)

This invention relates to new water-insoluble monoazo and disazo dyestuffs, a process for their production and their use for dyeing organic derivatives of cellulose and fiber-forming synthetic materials.

It is an object of this invention to provide new water-insoluble monoazo and disazo dyestuffs which are eminently suitable for dyeing organic derivatives of cellulose and fiber-forming synthetic materials.

A further object of the invention is to provide new water-insoluble monoazo and disazo dyestuffs which give on cellulose acetate, dyeings of excellent waste gas fastness.

Another object of the invention is to provide a process for the production of such water-insoluble monoazo and disazo dyestuffs.

We have found that valuable monoazo or disazo dyestuffs having the properties above enumerated are obtained by diazotizing a 1,3,4-thiadiazole of the general Formula I:

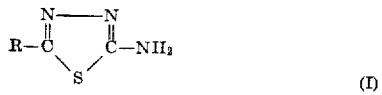

in which R represents a methyl, an ethyl, a cyclohexyl, a phenyl, a tolyl, a chlorphenyl, a nitrophenyl, a (2-amino-1,3,4-thiadiazolyl-5)-ethyl or a (2-amino-1,3,4-thiadiazolyl-5)-phenyl radical, and coupling it with a compound of the general Formula II:

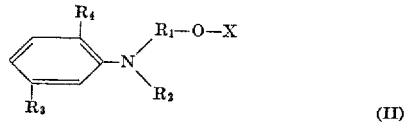

in which $R_1$ represents an alkylene radical with 2 to 6 carbon atoms, a chloralkylene radical with 3 to 4 carbon atoms or a cyanalkylene radical with 4 carbon atoms, X represents a hydrogen atom, an alkyl group with 1 to 3 carbon atoms, a hydroxyalkyl group with 2 to 3 carbon atoms, a cyanalkyl group with 2 to 4 carbon atoms or the acyl radical of an aliphatic monocarboxylic acid with 1 to 6 carbon atoms, $R_2$ represents an alkyl group with 1 to 6 carbon atoms, a cyanalkyl group with 2 to 4 carbon atoms, a chloralkyl group with 1 to 4 carbon atoms or a group of the formula —$R_5$—O—Y, in which $R_5$ may have the same meaning as $R_1$ and Y may have the same meaning as X and the group —$R_5$—O—Y may be different from the group —$R_1$—O—X, $R_3$ represents a hydrogen atom, a methyl group, an ethyl group, a chlorine atom, a trifluormethyl group, or an acetylamino group and $R_4$ represents a hydrogen atom, a methoxy group or an ethoxy group.

Examples of diazo components for the production of the new dyestuffs are 2-amino-5-methyl-1,3,4-thiadiazole, 2-amino-5-ethyl-1,3,4-thiadiazole, 2-amino-5-cyclohexyl-1,3,4-thiadiazole, 2-amino-5-phenyl-1,3,4-thiadiazole, 2-amino-5-(4-methylphenyl)-thiadiazole, 2-amino-5-(3-nitrophenyl)-1,3,4-thiadiazole, 2-amino-5-(4-nitrophenyl)-1,3,4-thiadiazole, 2-amino-5-(4-chlorophenyl)-1,3,4-thiadiazole, 1,2-bis-(2-amino-1,3,4-thiadiazolyl-5)-ethane and 1,4-bis-(2-amino-1,3,4-thiadiazolyl-5)-benzene. The production of these compounds is described for example in German patent specification No. 1,067,440.

The coupling of the said diazo compounds with the said coupling components may be carried out for example by diazotizing the compound of Formula I in a non-aqueous solution, removing any excess of nitrous acid present by the addition of a small amount of urea, and uniting the resultant diazo solution with a non-aqueous solution of the coupling component. An addition of sodium acetate is often recommendable.

Low molecular aliphatic carboxylic acids are especially suitable as solvents for the diazotization of the compounds of Formula I; we prefer to use mixtures of anhydrous acetic acid and anhydrous propionic acid.

The compounds of Formula I are preferably diazotized with solutions of nitrosylsulphuric acid in concentrated sulphuric acid. If monoazo dyestuffs are to be prepared, it is advantageous to use the nitrosylsulphuric acid in amounts which are equimolar or nearly equimolar to the amounts of the compound of Formula I. For the production of diazo dyestuffs, the nitrosylsulphuric acid is used in amounts corresponding to about two mols per mol of the tetrazo component used.

Suitable solvents for the coupling components are for example the carboxylic acids already specified as solvents for the diazo components, and in addition low molecular aliphatic alcohols, such as methanol, or mixtures of these alcohols with the said carboxylic acids.

During the diazotization it is advisable to maintain a temperature of 0° to 10° C. in the reaction mixture.

When the coupling is completed, the finished dyestuff is isolated in the usual way, for example by pouring the reaction mixture onto ice, filtering off the deposited dyestuff and drying it.

An especially preferred embodiment of the production process consists in producing the necessary diazo component of Formula I in the reaction mixture and then, without isolating it, reacting it with one of the said coupling components to form a monoazo or disazo dyestuff.

This may be achieved by treating a 1-acyl-thiosemicarbazide with concentrated sulphuric acid, diazotizing with nitrosylsulphuric acid the solution of the 1,3,4-thiadiazole derivative thus formed and then further reacting the mixture to form the azo dyestuff as described above.

In the treatment of the 1-acylthiosemicarbazide, cyclization occurs and the 2-amino-1,3,4-thiadiazole is formed according to the following scheme:

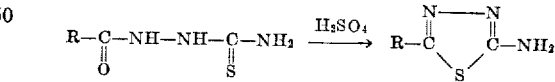

In this scheme R has the meaning given above. For the production of bis-(2-amino-1,3,4-thiadiazolyl-5)-alkanes or -benzenes, there are used the corresponding bis-thiosemicarbazide compounds; for example terephthalyl-bis-thiosemicarbazide is used to produce 1,4-bis-(2-amino-1,3,4-thiadiazolyl-5)-benzene according to the following scheme:

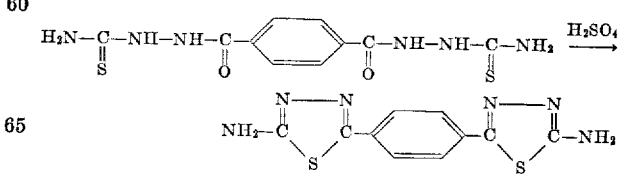

The treatment of the 1-acyl-thiosemicarbazides with concentrated sulphuric acid is carried out while stirring at temperatures of about 0° to about 50° C., preferably at 15° to 30° C. It is recommendable to stir for some hours at the same temperature, for example for two hours at 20° C., until the reaction has ended. This advantageous embodiment makes it possible to obtain the desired azo dyestuffs directly from 1-acylthiosemicarbazides without special measures being necessary for the isolation and purification of the intermediate products.

Examples of 1-acylthiosemicarbazides are 1-acetyl-, 1-propionyl-, 1-hexahydrobenzoyl-, 1-benzoyl-, 1-(methylbenzoyl)-, 1-(chlorbenzoyl)-, 1-(nitrobenzoyl)-thiosemicarbazide, succinyl-bis-thiosemicarbazide, terephthalyl-bis-thiosemicarbazide and iso-terephthalyl-bis-thiosemicarbazide.

The new dyestuffs have the general Formula III:

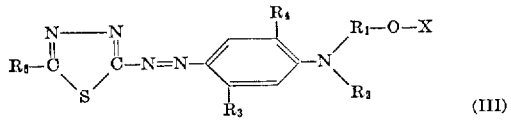

in which $R_1$, $R_2$, $R_3$, $R_4$ and X have the meanings given above, $R_6$ stands for a methyl, ethyl, cyclohexyl, phenyl, tolyl, chlorphenyl or nitrophenyl radical or a radical of the general Formula IV:

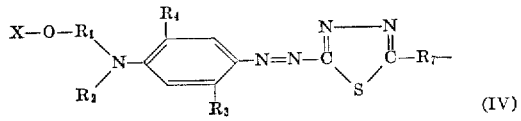

in which $R_1$, $R_2$, $R_3$, $R_4$ and X have the means given above and $R_7$ stands for an ethylene or phenylene radical.

The new dyestuffs are eminently suitable for dyeing textile fabrics, such as fibers, flocks, threads, woven and non-woven textiles of cellulose 2½-acetate, cellulose triacetate, synthetic polyamides, such as nylon, linear synthetic polyesters, such as polyethylene terephthalate, and polymers containing acrylonitrile. Acrylonitrile-containing polymers are for example polyacrylonitrile and copolymers of acrylonitrile with vinyl chloride or vinyl acetate, the tinctorial character of these copolymers being determined by the acrylonitrile component. Commercial copolymers of acrylonitrile with other compounds usually contain acrylonitrile in amounts of 50% or more of their weight.

The new dyestuffs are also suitable for dyeing plastics, as for example polyvinyl chloride, and lacquers.

The dyeings of the new dyestuffs on cellulose acetate having excellent fastness to waste gas.

The following examples will further illustrate this invention but the invention is not restricted to these examples. The parts, unless otherwise stated, are by weight. Parts by volume bear the same relation to parts by weight as the cubic centimeter to the gram.

Example 1

10 parts by volume of nitrosylsulphuric acid with a nitrous anhydride content of 6.4% are stirred while cooling well with 40 parts of a mixture of 85 parts of glacial acetic acid and 15 parts of propionic acid. At 0° to 5° C. there are introduced into this mixture 4.5 parts of 2-amino-5-phenyl-1,3,4-thiadiazole. Another 85 parts of the mixture of 85 parts of glacial acetic acid and 15 parts of propionic acid are added and the whole stirred at the same temperature for another 2½ hours. 2 parts of urea are added to remove any excess of nitrous acid and the mixture is stirred for 30 minutes. There is then added to the clear solution of the diazonium salt a solution of 3 parts of N-(2-hydroxyethyl)-N-ethylaminobenzene dissolved in 25 parts of methanol. The mixture is stirred for another hour, then 600 parts of sodium acetate are added and the whole stirred for another 30 minutes, the temperature being kept below 10° C. The mixture is then poured onto ice in order to separate the dyestuff formed. It is filtered off under reduced pressure, washed with water and dried. The dyestuff dyes cellulose acetate fibers brilliant red shades of very good fastness to light and waste gas.

Example 2

4.5 parts of 2-amino-5-phenyl-1,3,4-thiadiazole are diazotized as in Example 1 with a mixture of nitrosylsulphuric acid, glacial acetic acid and propionic acid. The solution of the diazonium salt is freed from any excess of nitrous acid by the addition of 2 parts of urea and then added a little at a time to a solution of 4.2 parts of N-(2-acetoxyethyl)-N-(2-cyanoethyl)-aminobenzene in a mixture of 10 parts by volume of hydrochloric acid with a density of 1.155 and 15 parts of water. After about 30 minutes the solution is diluted carefully with about 200 parts by volume of water; 70 to 80 parts of sodium acetate are added while stirring well, the whole is stirred for another 30 minutes and the mixture poured onto ice to separate the dyestuff formed. The dyestuff is filtered off under reduced pressure, washed with water and dried; it dyes cellulose acetate fibers orange-red shades of excellent fastness to light, washing and waste gas.

Example 3

4.5 parts of 2-amino-5-phenyl-1,3,4-thiadiazole are diazotized as described in Example 1 and the solution of the diazonium salt freed from excess nitrous acid. The diazonium salt solution is allowed to flow gradually at a temperature below 10° C. into a solution of 4.5 parts of N-di-(2-hydroxyethyl)-3-trifluormethyl-aminobenzene in 150 parts of a mixture of 85 parts of glacial acetic acid, 15 parts of propionic acid and 200 parts of methanol. The mixture is stirred for another hour, then 60 parts of sodium acetate are added while stirring, the temperature being kept below 10° C. Stirring is continued for another 30 minutes and the mixture then poured onto ice. The dyestuff formed is worked up as described in Examples 1 and 2. It dyes cellulose acetate fibers red shades of very good fastness to light, washing and waste gas.

A dyestuff having similar properties is obtained by using 4.8 parts of N-(2-acetoxyethyl)-N-(2-cyanoethyl)-3-chlor-1-aminobenzene instead of 4.5 parts of N-di-(2-hydroxyethyl)-3-trifluormethyl-aminobenzene.

Example 4

4.8 parts of 2-amino-5-(3-methylphenyl)-1,3,4-thiadiazole are diazotized as in Example 1. The solution of the diazonium salt is freed from any excess of nitrous acid and added gradually to a solution of 3 parts of N-(2-hydroxyethyl)-N-ethylaminobenzene in 150 parts of a mixture of 85 parts of glacial acetic acid and 15 parts of propionic acid. The temperature of the mixture is kept below 10° C. After stirring for another hour, 60 parts of sodium acetate are added to the mixture which is stirred for another 30 minutes and then poured onto ice. The dyestuff formed is worked up as in Example 1. It dyes cellulose acetate fibers brilliant red shades of good fastness to light and excellent fastness to waste gas.

A dyestuff of similar properties is obtained by using 3.25 parts of 2-amino-5-ethyl-1,3,4-thiadiazole instead of 4.8 parts of 2-amino-5-(3-methylphenyl)-1,3,4-thiadiazole. This dyes cellulose acetate fibers scarlet red shades.

Example 5

4.55 parts of 2-amino-5-cyclohexyl-1,3,4-thiadiazole are diazotized as in Example 1. The solution of the diazonium salt is freed from excess nitrous acid and gradually added at a temperature of 10° C. to a solution of 3 parts of N-(2-hydroxyethyl)-N-ethylaminobenzene in 150 parts of a mixture of 85 parts of glacial acetic acid and 15 parts of propionic acid. The mixture is stirred for another hour, 60 parts of sodium acetate are added, the temperature being kept below 10° C., and the whole stirred for another 30 minutes. The mixture is then poured onto ice and the dyestuff worked up as in Example 1. It dyes cellulose acetate fibers brilliant orange-red shades of very good fastness to light, wet treatment and waste gas.

A dyestuff of similar properties is obtained by using 2.9 parts of 2-amino-5-methyl-1,3,4-thiadiazole instead of 2-amino-5-cyclohexyl-1,3,4-thiadiazole.

*Example 6*

10 parts by volume of nitrosylsulphuric acid with a nitrous anhydride content of 7% are added while cooling well to 40 parts of a mixture of 85 parts of glacial acetic acid and 15 parts of propionic acid. 3.5 parts of 1,3-bis-(2-amino - 1,3,4 - thiadiazolyl-5)-benzene are introduced into this mixture and another 40 parts of the mixture of glacial acetic acid and propionic acid added. The whole is stirred for 2½ hours at 0° to 5° C.; 2 parts of urea are added to remove any excess of nitrous acid and the mixture stirred for another 30 minutes. The diazonium salt solution is then allowed to trickle at a temperature below 10° C. into a solution of 3 parts of N-(2-hydroxyethyl)-N-ethylaminobenzene in 150 parts of a mixture of 85 parts of glacial acetic acid and 15 parts of propionic acid. After stirring for another hour, 60 parts of sodium acetate are added, the mixture stirred for another 30 minutes and then poured onto ice. The product is worked up as in Example 1. The dyestuff formed, which has the formula:

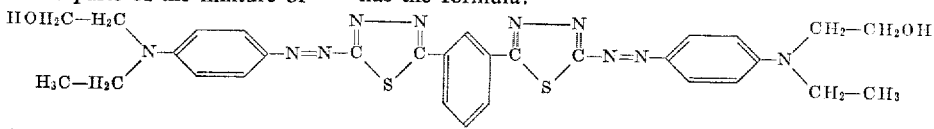

dyes cellulose acetate fibers bluish red shades of very good fastness to light, wet treatment and waste gas.

Dyestuffs with similar properties are obtained from the following components:

| Example No. | Diazo component | Coupling component | Shade of color of dyeing on cellulose acetate |
|---|---|---|---|
| 7 | phenyl-thiadiazolyl-NH₂ | N,N-(CH₂-CH₂-OCOCH₃)(CH₂-CH₂-CN)-benzene, CH₃ substituent | red. |
| 8 | phenyl-thiadiazolyl-NH₂ | N,N-(CH₂-CH₂-O-COCH₃)(CH₂-CH₃)-benzene | Do. |
| 9 | phenyl-thiadiazolyl-NH₂ | N,N-(CH₂-CH₂-OH)(CH₂-CH₂-OH)-benzene, CH₃ substituent | Do. |
| 10 | NO₂-phenyl-thiadiazolyl-NH₂ | N,N-(CH₂-CH₂-OCOCH₃)(CH₂-CH₂-OH)-benzene, Cl substituent | Do. |
| 11 | NO₂-phenyl-thiadiazolyl-NH₂ | N,N-(CH₂-CH₂-CH₂-CH₂-CH₂-CH₂-OH)(CH₂-CH₃)-benzene | bluish red. |
| 12 | O₂N-phenyl-thiadiazolyl-NH₂ | N,N-(CH₂-CH₂-OCOCH₃)(CH₂-CH₂-CN)-benzene | red-orange. |
| 13 | O₂N-phenyl-thiadiazolyl-NH₂ | N,N-(CH₂-CH₂-OCH₃)(CH₂-CH₃)-benzene | bluish-red. |
| 14 | H₃C-H₂C-thiadiazolyl-NH₂ | N,N-(CH₂-CH₂-O-COCH₃)(CH₂-CH₂-CN)-benzene | orange. |
| 15 | H₃C-H₂C-thiadiazolyl-NH₂ | N,N-(CH₂-CH₂-OCOCH₃)(CH₂-CH₃)-benzene | Do. |
| 16 | H₃C-thiadiazolyl-NH₂ | N,N-(CH₂-CH₂-OCOCH₃)(CH₂-CH₃)-benzene | Do. |
| 17 | H₃C-thiadiazolyl-NH₂ | N,N-(CH₂-CH₂-OCOCH₃)(CH₂-CH₂-CN)-benzene, CH₃ substituent | Do. |
| 18 | H₃C-thiadiazolyl-NH₂ | N,N-(CH₂-CH₂-OCOCH₃)(CH₂-CH₂-CN)-benzene, Cl substituent | Do. |

| Example No. | Diazo component | Coupling component | Shade of color of dyeing on cellulose acetate |
|---|---|---|---|
| 19 | 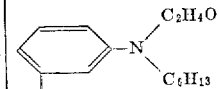 H₂N—C(=N-N=)—S—CH₂—CH₂—C(=N-N=)—S—NH₂ | 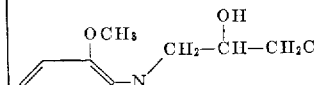 phenyl-N(CH₂—CH₂—OCOCH₃)(CH₂—CH₂—CN) | Do. |

Example 20

While stirring, 4.87 parts of 1-benzoylthiosemicarbazide are dissolved at 20° C. in 10 parts of concentrated sulphuric acid (98%) and the mixture stirred for two hours at the same temperature. It is then cooled to 0° to 5° C. and allowed to flow while stirring into a mixture of 20 parts of nitrosylsulphuric acid with a nitrous anhydride content of 5.3%, 21 parts of anhydrous acetic acid and 4 parts of propionic acid. 25 parts of a mixture of 21 parts of anhydrous acetic acid and 4 parts of propionic acid are added and the whole is stirred for another three hours at 0° to 5° C. To remove any excess of nitrous acid, 1 part of urea is added to the solution, which is stirred for another 30 minutes and then allowed to flow gradually at 0° to 5° C. into a solution of 5.5 parts of N-(2-hydroxy-3-cyanopropyl)-N-ethylaminobenzene in a mixture of 5 parts of hydrochloric acid of the density 1.155 and 25 parts of water. The whole is stirred for another hour at 0° to 5° C., 20 parts of ice and 4.6 parts of anhydrous sodium acetate are added and the mixture stirred for another hour in order to separate the reaction product. The reaction product is then filtered off, washed with water until it reacts neutrally and dried. A dyestuff is obtained which dyes cellulose acetate, linear fiber-forming polyesters and synthetic linear polyamides brilliant red shades of excellent fastness to light, wet treatment and waste gas.

Example 21

A mixture of 6.65 parts of 1-acetylthiosemicarbazide and 10 parts of concentrated sulphuric acid is stirred for two hours at 20° C. and the solution then allowed to flow at 0° to 5° C. while stirring into a mixture which has been prepared from 30 parts of nitrosylsulphuric acid with a nitrous anhydride content of 7.1% and 50 parts of a mixture of 17 parts of anhydrous acetic acid and 3 parts of propionic acid while cooling well. Another 50 parts of the same mixture of acetic acid and propionic acid are added to this mixture, which is then stirred for another three hours at 0° to 5° C. 2 parts of urea are added; the mixture is stirred for another 30 minutes and then allowed to flow gradually into a solution of 12.3 parts of N-(2-cyanethoxyethyl)-N-butylaminobenzene in a mixture of 5 parts of hydrochloric acid of the density 1.155 and 20 parts of water at 0° to 5° C. The mixture is stirred for another hour at 0° to 5° C., 20 parts of ice and 48.5 parts of anhydrous sodium acetate are added and the whole stirred for another hour. The dyestuff formed is then filtered off, washed with water and dried. It dyes cellulose acetate, linear fiber-forming polyesters and synthetic linear polyamides brilliant red shades of excellent fastness to wet treatment and waste gas.

Example 22

A mixture of 11.5 parts of 1-(4-chlorbenzoyl)-thiosemicarbazide and 60 parts of concentrated sulphuric acid is stirred for two hours at 20° C. It is then allowed to flow while stirring at 0° to 5° C. into a mixture of 29 parts of nitrosylsulphuric acid with a nitrous anhydride content of 7.5% and 50 parts of a mixture of 17 parts of anhydrous acetic acid and 3 parts of propionic acid. Another 50 parts of the said mixture of acetic acid and propionic acid are then added to the mixture which is subsequently stirred for another 30 minutes. This mixture is then gradually added to a mixture of 11.4 parts of N-(2-cyanoethyl)-N-(2-propoxyethyl)-aminobenzene, 8 parts of hydrochloric acid of the density 1.155 and 30 parts of water. The whole is stirred for another hour at 0° C. to 5° C., then poured onto ice and the dyestuff formed is worked up as described in Example 1. It dyes cellulose acetate, linear fiber-forming polyesters and synthetic linear polyamides brilliant red shades of excellent fastness to wet treatment and waste gas.

Other dyestuffs having similar properties are obtained by coupling the disodium salt of 2-amino-5-(4-chlorphenyl)-1,3,4-thiadiazole prepared as described in the first paragraph of this example with the compounds set out in the following table:

| Example No. | Coupling component | Shade of color of dyeing on polyethylene glycol terephthalate |
|---|---|---|
| 23 | 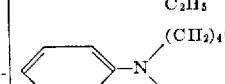 4-Cl-phenyl-N(C₂H₄OH)(C₆H₁₃) | red. |
| 24 | 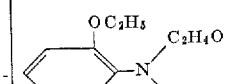 2-OCH₃-phenyl-N(CH₂—CH(OH)—CH₂Cl)(C₂H₅) | ruby. |
| 25 | 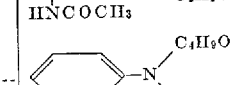 phenyl-N((CH₂)₄OCH₂CN)(CH₃) | red. |
| 26 | 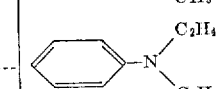 2-OC₂H₅-4-HNCOCH₃-phenyl-N(C₂H₄OH)(C₂H₄OH) | violet. |
| 27 | 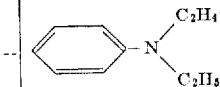 phenyl-N(C₄H₉OCOCH₃)(CH₃) | orange. |
| 28 | 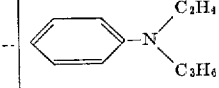 phenyl-N(C₂H₄OC₂H₅)(C₆H₁₃) | red. |
| 29 | 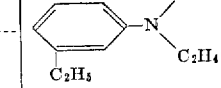 phenyl-N(C₂H₄OC₂H₄OH)(C₂H₅) | ruby. |
| 30 | phenyl-N(C₂H₄OCHO)(C₃H₆CN) | red. |
| 31 | 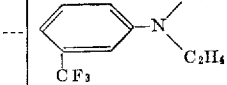 3-C₂H₅-phenyl-N(C₂H₄OH)(C₂H₄Cl) | red. |
| 32 | 4-CF₃-phenyl-N(C₂H₄OH)(C₂H₄CN) | red. |

Example 33

A diazo solution of 5-(4-chlorphenyl)-2-amino-1,3,4-thiadiazole prepared as in Example 3 is allowed to flow gradually while stirring at 0° to 5° C. into a solution of 10.9 parts of 1-(N-(2-hydroxyethyl))-N-butylamino-2-methylbenzene in a mixture of 10 parts of hydrochloric acid of the density 1.155 and 30 parts of water. The mixture is stirred for another hour at 0° to 5° C., poured onto ice and the dyestuff formed is worked up as described in Example 20. It dyes cellulose acetate, linear fiber-forming polyesters and synthetic linear polyamides ruby-red shades of excellent fastness to wet treatment and waste gas.

Example 34

A solution of the diazonium of 5-(4-chlorphenyl)-2-amino-1,3,4-thiadiazole prepared as in Example 22 is added gradually at 0° to 5° C. while stirring to a solution of 18 parts of N-(2-hydroxyethyl)-N-(2-acetoxyethyl)-aminobenzene in a mixture of 6 parts of hydrochloric acid of the density 1.155 and 30 parts of water. After stirring for an hour at 0° to 5° C., the mixture is poured onto ice and the dyestuff worked up as described above. It dyes cellulose acetate, linear fiber-forming polysters and synthetic linear polyamides brilliant red shades of very good fastness to wet treatment and waste gas.

A red dyestuff of similar properties is obtained by using 11.2 parts of N-(2-hydroxy-3-chlorpropyl)-N-ethylaminobenzene instead of 18 parts of N-(2-hydroxyethyl)-N-(2-acetoxyethyl)-aminobenzene and 10 parts of hydrochloric acid of the density 1.155 instead of 6 parts of the same.

Example 35

A solution of the diazonium salt of 5-(4-chlorphenyl)-2-amino-1,3,4-thiadiazole prepared as in Example 22 is added gradually at 0° to 5° C. to a mixture of 10.7 parts of N-[2-(cyanopropoxy)-ethyl]-N-methylaminobenzene, 6 parts of hydrochloric acid of the density 1.155 and 30 parts of water. The mixture is stirred for another hour at 0° to 5° C., and then worked up as described above. A dyestuff is obtained which dyes cellulose acetate, linear fiber-forming polyesters and synthetic linear polyamides brilliant red shades of excellent fastness to wet treatment and waste gas.

Example 36

100 parts of a cellulose 2½-acetate fabric are dyed in a bath comprising 1.5 parts of the azo dyestuff of Example 1, 2 parts of Marseilles soap and 4000 parts of water for 50 minutes at 98° to 100° C.

A powerful red dyeing of excellent wet fastness and very good waste gas fastness is obtained.

Example 37

100 parts of a polyethylene glycol terephthalate fabric are dyed for 40 minutes at boiling temperature in a bath which contains 0.3 part of the finely divided dyestuff from the first paragraph of Example 4 and 4 parts of finely divided 1-hydroxy-2-phenylbenzene in 3000 parts of water. After thorough rinsing, the fabric is treated for 15 minutes at 80° C. in a bath which contains 3 parts of 32% aqueous sodium hydroxide solution and 3 parts of sodium dithionite in 3000 parts of water.

A deep red dyeing is obtained of very good wet fastness and very good fastness to sublimation, thermofixation, ironing and light.

We claim:

1. A water-insoluble azo dyestuff of the general formula in which:

$R_1$ represents a radical selected from the class consisting of an alkylene group with 2 to 6 carbon atoms, a chloralkylene group with 3 to 4 carbon atoms and a cyanalkylene group with 4 carbon atoms;

X represents a substituent selected from the class consisting of a hydrogen atom, an alkyl group with 1 to 3 carbon atoms, a hydroxyalkyl group with 2 to 3 carbon atoms, a cyanalkyl group with 2 to 4 carbon atoms and the acyl radical of an aliphatic monocarboxylic acid with 1 to 4 carbon atoms;

$R_2$ represents a radical selected from the class consisting of an alkylene group with 2 to 6 carbon atoms, a cyanalkylene group with 3 to 4 carbon atoms and a chloralkylene group with 2 to 4 carbon atoms;

Y represents a substituent selected from the class consisting of hydrogen, hydroxy, alkoxy with 1 to 3 carbon atoms, hydroxyalkoxy with 2 to 3 carbon atoms, a cyanalkoxy group with 3 to 4 carbon atoms and an acyloxy radical of an aliphatic monocarboxylic acid with 1 to 4 carbon atoms;

$R_2$—Y together also representing a methyl group;

$R_3$ represents a substituent selected from the class consisting of hydrogen, methyl, ethyl, chlorine, trifluoromethyl and acetylamino;

$R_4$ represents a substituent selected from the class consisting of hydrogen, methoxy and ethoxy; and $R_6$ represents a substituent selected from the class consisting of methyl, ethyl, cyclohexyl, phenyl, tolyl, chlorophenyl and nitrophenyl.

2. A dyestuff of the formula:

3. A dyestuff of the formula:

4. A dyestuff of the formula:

5. A dyestuff of the formula:

6. A dyestuff of the formula:

References Cited in the file of this patent

UNITED STATES PATENTS

| | | |
|---|---|---|
| 2,358,031 | Roblin et al. | Sept. 12, 1933 |
| 2,708,671 | Towne et al. | May 17, 1955 |
| 2,791,579 | Taube | May 7, 1957 |

FOREIGN PATENTS

| | | |
|---|---|---|
| 204,031 | Austria | Aug. 10, 1959 |

UNITED STATES PATENT OFFICE
CERTIFICATE OF CORRECTION

Patent No. 3,096,320                                   July 2, 1963

Guenter Lange et al.

It is hereby certified that error appears in the above numbered patent requiring correction and that the said Letters Patent should read as corrected below.

Column 3, line 28, for "means" read -- meanings --; line 46, for "having" read -- have --; columns 5 and 6, in the table, opposite Example No. 7, under the heading "Coupling component" for "$\overset{|}{C}H_2$" read -- $\overset{|}{C}H_3$ --; column 9, line 16, after "diazonium" insert -- salt --; line 24, for "polysters" read -- polyesters --; column 10, line 57, for "$C_2H_4$" read -- $C_2H_5$ --; line 70, for "1933" read -- 1944 --; line 75, for "204,031" read -- 204,665 --.

Signed and sealed this 3rd day of March 1964.

(SEAL)
Attest:
ERNEST W. SWIDER
Attesting Officer

EDWIN L. REYNOLDS

Acting Commissioner of Patents